(12) United States Patent
Tobe

(10) Patent No.: US 11,338,623 B2
(45) Date of Patent: May 24, 2022

(54) PNEUMATIC RADIAL TIRE

(71) Applicant: BRIDGESTONE CORPORATION, Tokyo (JP)

(72) Inventor: Takahiro Tobe, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 166 days.

(21) Appl. No.: 16/619,261

(22) PCT Filed: Nov. 30, 2017

(86) PCT No.: PCT/JP2017/043069
§ 371 (c)(1),
(2) Date: Dec. 4, 2019

(87) PCT Pub. No.: WO2018/225284
PCT Pub. Date: Dec. 13, 2018

(65) Prior Publication Data
US 2020/0094629 A1    Mar. 26, 2020

(30) Foreign Application Priority Data
Jun. 6, 2017  (JP) .............................. JP2017-111438

(51) Int. Cl.
*B60C 15/00*    (2006.01)
*B60C 9/08*     (2006.01)

(52) U.S. Cl.
CPC ............ *B60C 15/0063* (2013.01); *B60C 9/08* (2013.01); *B60C 15/0072* (2013.01)

(58) Field of Classification Search
CPC ............ B60C 15/0009; B60C 15/0063; B60C 15/0018; B60C 15/06
See application file for complete search history.

(56) References Cited

U.S. PATENT DOCUMENTS

| | | | | |
|---|---|---|---|---|
| 5,203,934 A | * | 4/1993 | Iida | B60C 3/04 |
| | | | | 152/454 |
| 5,335,707 A | * | 8/1994 | Sano | B60C 9/06 |
| | | | | 152/315 |
| 6,260,597 B1 | * | 7/2001 | Miyazono | B60C 15/0607 |
| | | | | 152/543 |

FOREIGN PATENT DOCUMENTS

| | | |
|---|---|---|
| EP | 0238679 A1 | 9/1987 |
| EP | 0395039 A2 | 10/1990 |

(Continued)

OTHER PUBLICATIONS

Jan. 9, 2018 International Search Report issued in International Patent Application No. PCT/JP2017/043069.

(Continued)

*Primary Examiner* — Cedrick S Williams
(74) *Attorney, Agent, or Firm* — Oliff PLC

(57) ABSTRACT

A ply of a carcass of a pneumatic radial tire includes a turn-up ply and a down ply. The turn-up ply includes: a main body portion disposed between a pair of bead cores; turn-up portions around the bead cores from an inside toward an outside in a tire width direction. The down ply extends up to an inside in a radial direction of the bead cores so as to cover the turn-up ply including the turn-up portions from an outside. A curvature is formed at either one of a down ply predetermined portion of the down ply, which covers a turn-up end portion of the turn-up portion of the down ply from an outside in the tire width direction, and a turn-up ply portion that covers the turn-up end portion of the turn-up portion in the main body portion of the turn-up ply from inside in the tire width direction.

4 Claims, 3 Drawing Sheets

(56) References Cited

FOREIGN PATENT DOCUMENTS

| | | | |
|---|---|---|---|
| EP | 2444258 | A2 | 4/2012 |
| GB | 992341 | A | 5/1965 |
| JP | S59-199303 | A | 11/1984 |
| JP | H06-143949 | A | 5/1994 |
| JP | 2758649 | B2 | 5/1998 |
| JP | 2007-190963 | A | 8/2007 |
| JP | 2009-269426 | A | 11/2009 |
| JP | 2010-115953 | A | 5/2010 |
| KR | 100792997 | B1 * | 1/2008 |
| LU | 41332 | A1 | 9/1962 |

OTHER PUBLICATIONS

Mar. 26, 2021 Office Action issued in Chinese Patent Application No. 201780091682.3.
Dec. 22, 2020 Search Report issued in European Patent Application No. 17912939.0.

* cited by examiner

PNEUMATIC RADIAL TIRE

TECHNICAL FIELD

The present invention relates to an improvement on a pneumatic radial tire that is particularly required to offer high pressure resistance and durability.

BACKGROUND ART

A pneumatic radial tire includes a carcass that includes a rubber-coated layer of a ply extending in a radial direction of the tire and the carcass is formed into a toroidal shape between a pair of bead cores.

The carcass ply includes a turn-up ply that is extended as a main structure of the tire across the pair of bead cores and that is turned up around the respective bead cores from an inside toward an outside in a tire width direction.

The turn-up ply includes a main body portion disposed between the pair of bead cores and a turn-up portion that is turned up around the respective bead cores from the inside toward the outside in the tire width direction.

In the pneumatic radial tire having a high pressure-resistant structure, a side wall portion bears a maximum tensile load and thus assumes a starting point of fracture.

The side wall portion of the tire represents an area in which the turn-up portion that is turned up around the bead core of the turn-up ply from the inside toward the outside in the tire width direction exists.

Thus, in the pneumatic radial tire having a high pressure resistance and durability, a down ply covers from the outside the turn-up ply including the turn-up portion turned up around the bead core.

An extremely high internal pressure exceeding ten atmospheric pressure is specified, in particular, for the pneumatic radial tire for airplane. In order to ensure a high level of reliability in the tire, a need exists for reduction in weight of the tire as much as feasible for an intended use in airplane, while tire components are required to satisfy pressure resistance performance several times as high as the specified internal pressure.

Additionally, because a load borne by the pneumatic radial tire for airplane while the tire is running is large, the carcass is set so as to deform largely to thereby be able to flex heavily. A need thus existed for a material that could withstand repeated deformation.

A technique (see, for example, Patent Document 1) has thus been developed to promote reduction in weight of the tire by reducing the number of laminated carcass plies, while achieving pressure resistance and durability by using, for a carcass ply cord, an organic fiber having a high breaking strength.

PRIOR ART DOCUMENT

[Patent Document]

Patent Document 1: JP 2007-190963 A

The technique disclosed in Patent Document 1 incorporates a carcass ply that offers high pressure resistance and durability and in which a polyketone fiber cord having a high breaking strength is coated with rubber. The technique thereby reduces the number of laminated carcass plies and achieves reduction in weight of the tire.

SUMMARY OF INVENTION

Underlying Problems to be Solved by the Invention

The reduction in the number of laminated carcass plies through the use of the carcass ply offering high pressure resistance and durability as in the technique disclosed in Patent Document 1 increases tension borne by each carcass ply to account for the reduced number of laminated carcass plies.

In addition, the down ply that covers a turn-up end portion of the turn-up ply from the outside in the tire width direction and the main body portion of the turn-up ply that covers the turn-up end portion of the turn-up ply from the inside are pulled to the inside and outside in a tire radial direction with the turn-up end portion substantially as a boundary and are placed in a tensioned equilibrium state.

The turn-up end portion of the turn-up portion that represents a portion of the turn-up ply turned up around the bead core from the inside toward the outside in the tire width direction exists in the side wall portion. Ply stiffness drastically changes before and after the turn-up end portion (in a vertical direction). This drastic change in the ply stiffness causes a peak in tensile force to occur in the plies adjacent, outside and inside, to the ply having the end portion.

This portion serves as a bottleneck during pressure resistance testing and, as a result, initial performance cannot be exhibited and sufficient pressure resistance is difficult to be achieved.

The present invention has been made in view of the foregoing situation and it is an object of the present invention to provide a pneumatic radial tire that maintains high pressure resistance and offers favorable durability, while achieving reduction in weight.

Means to Solve the Problems

To achieve the foregoing object, a pneumatic radial tire in an aspect of the present invention includes a carcass that includes a rubber-coated layer of a carcass ply extending in a radial direction of the tire, the carcass being formed into a toroidal shape between a pair of bead cores. In the pneumatic radial tire, the carcass ply of the carcass includes a turn-up ply and a down ply. The turn-up ply includes: a main body portion extended across and disposed between the pair of bead cores; and turn-up portions turned up around the respective bead cores from an inside toward an outside in a tire width direction. The down ply extends up to at least an inside in a tire radial direction of the bead cores so as to cover the turn-up ply including the turn-up portions from an outside. A curvature is formed at at least either one of a down ply predetermined portion of the down ply that covers a turn-up end portion of the turn-up portion of the turn-up ply from an outside in the tire width direction, and a turn-up ply predetermined portion that covers the turn-up end portion of the turn-up portion in the main body portion of the turn-up ply from an inside in the tire width direction.

Through the foregoing configuration, the curvature is formed at at least either one of the down ply predetermined portion of the down ply that covers the turn-up end portion of the turn-up portion of the turn-up ply from an outside in the tire width direction, and the turn-up ply predetermined portion that covers the turn-up end portion of the turn-up portion in the main body portion of the turn-up ply from an inside in the tire width direction. Thus, a peak in tensile force in the ply adjacent to the ply having the turn-up end portion can be eased during pressure resistance testing, so that sufficient durability can be achieved with initial pressure resistance being maintained.

The turn-up ply and the down ply are each formed of at least one layer.

The above durability can be sufficiently maintained even through reduction in weight by incorporating plies offering high pressure resistance and high durability to thereby reduce the number of laminated turn-up plies and down plies.

Preferably, the curvature is formed at the down ply predetermined portion so as to locally bulge in a semi-elliptical shape in cross section to an outside.

Through the foregoing configuration, the curvature is formed at the down ply predetermined portion so as to locally bulge in the semi-elliptical shape, so that a curvature structure can be simplified.

Preferably, the curvature is formed into a wave shape at the down ply predetermined portion so as to bulge to an outside and an inside.

Through the foregoing configuration, the curvature having a wave shape is formed at the down ply predetermined portion. Thus, an amplitude of the wave shape can be reduced and the elongation caused by the curvature can be amply obtained.

Preferably, the curvature is formed at the turn-up ply predetermined portion so as to locally bulge in a semi-elliptical shape in cross section to an inside.

Through the foregoing configuration, the curvature is formed at the turn-up ply predetermined portion so as to locally bulge in the semi-elliptical shape, so that a curvature structure can be simplified.

Preferably, the curvature is formed into a wave shape at the turn-up ply predetermined portion so as to bulge to an outside and an inside.

Through the foregoing configuration, the curvature having a wave shape is formed at the turn-up ply predetermined portion. Thus, an amplitude of the wave shape can be reduced and the elongation caused by the curvature can be amply obtained.

Advantageous Effects of the Invention

In the present invention, at least either one of the down ply predetermined portion of the down ply that covers the turn-up end portion of the turn-up portion of the turn-up ply from the outside in the tire width direction, and the turn-up ply predetermined portion that covers the turn-up end portion of the turn-up portion in the main body portion of the turn-up ply from the inside in the tire width direction is formed to be curved. Thus, a peak in tensile force in the ply adjacent to the ply having the turn-up end portion can be eased during pressure resistance testing, so that sufficient durability can be achieved with initial pressure resistance being maintained.

The above durability can be sufficiently maintained even through reduction in weight by incorporating plies offering high pressure resistance and high durability to thereby reduce the number of laminated turn-up plies and down plies.

MODE FOR CARRYING OUT THE INVENTION

Embodiments to which the present invention is applied will be described below with reference to the accompanying drawings.

Figure 1:
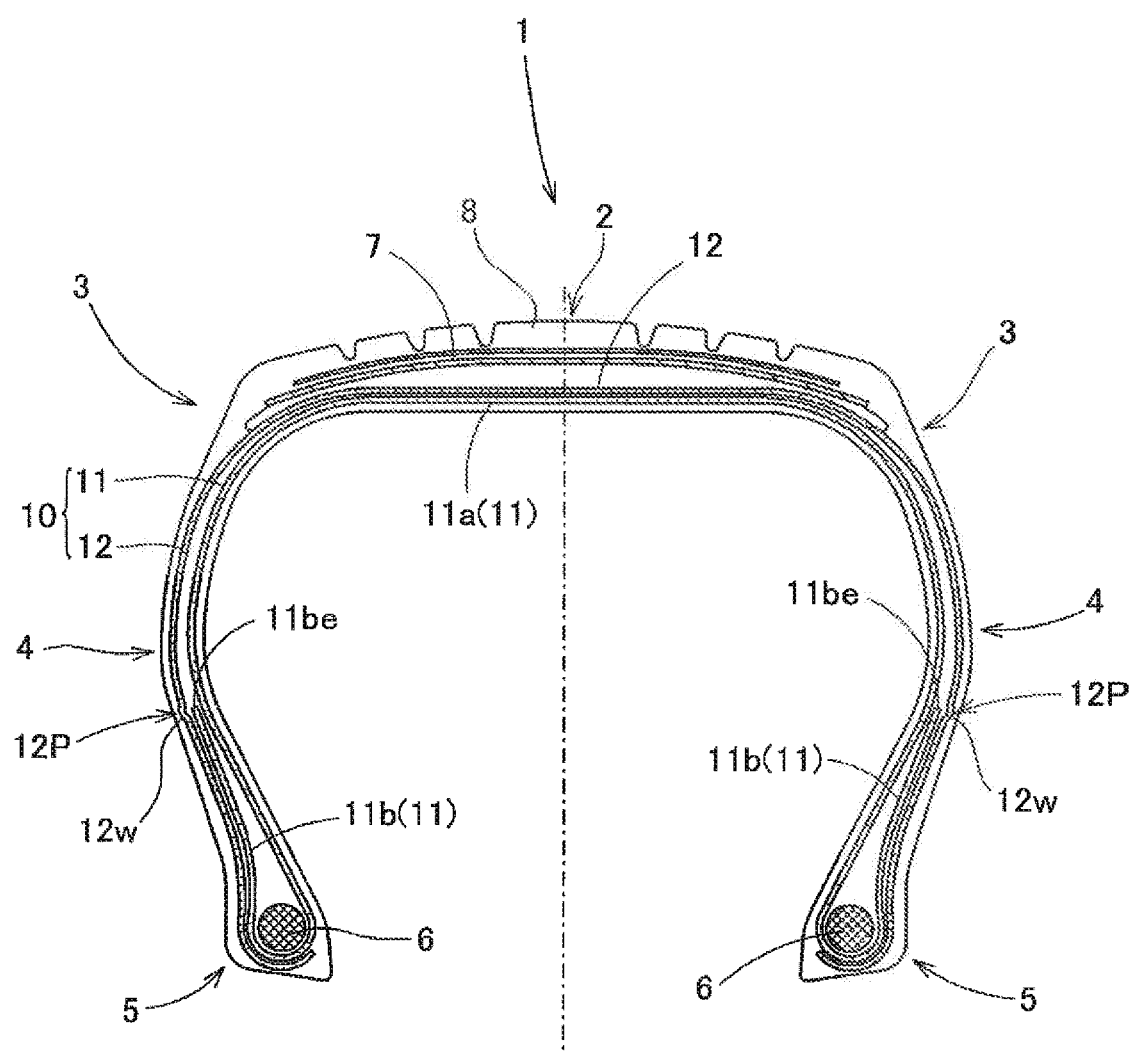
FIG. 1 is a cross-sectional view taken along a tire width direction, depicting a pneumatic radial tire according to an embodiment of the present invention.
Figure 2:
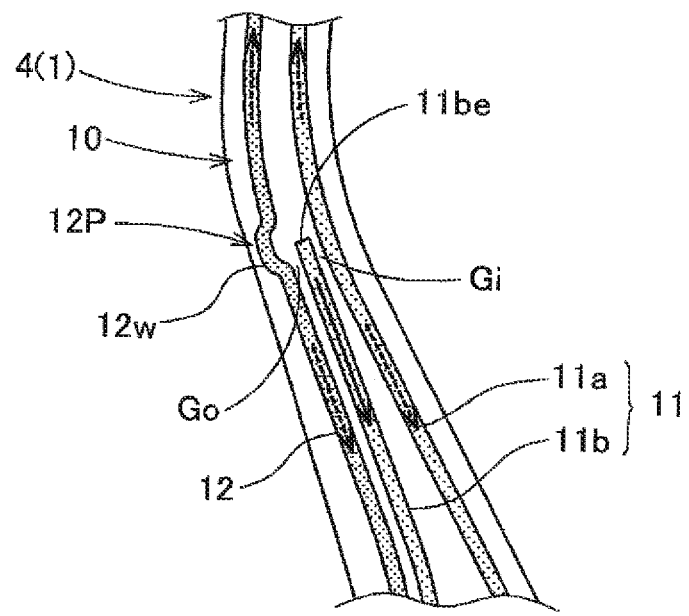
FIG. 2 is an enlarged cross-sectional view of major components of the pneumatic radial tire according to the embodiment of the present invention.
Figure 3:
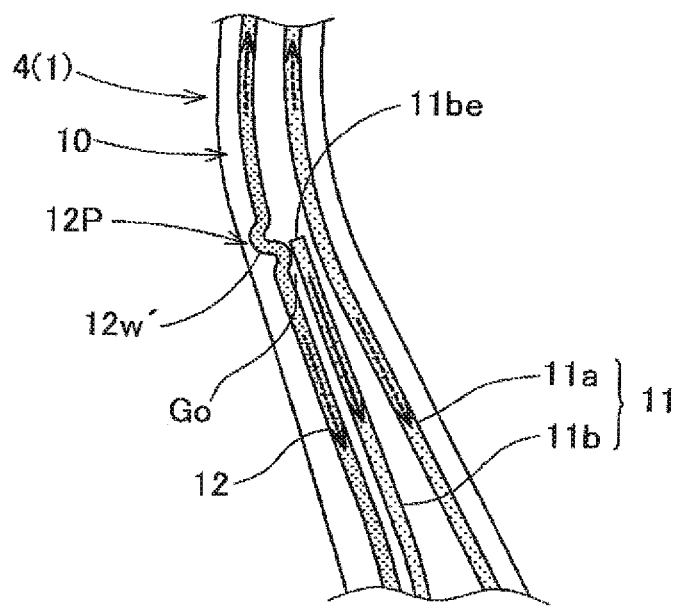
FIG. 3 is an enlarged cross-sectional view of major components of a pneumatic radial tire according to a modification of the embodiment of the present invention.

FIGS. 1 to 3 depicts an embodiment of the present invention. FIG. 1 is a cross-sectional view of a pneumatic radial tire 1 according to an embodiment of the present invention, taken along a width direction of the pneumatic radial tire 1. The pneumatic radial tire 1 is a pneumatic radial tire for airplane.

The pneumatic radial tire 1 has a toroidal shape. A pair of side wall portions 4 extends via shoulder portions 3 toward an inside in a tire radial direction from both sides in a tire width direction of a crown portion 2, which contacts a ground surface. A pair of bead portions 5 is formed at inner peripheral ends inside in the tire radial direction of the side wall portions 4. Bead cores 6 are embedded in the bead portions 5.

A carcass 10, which includes a rubber-coated layer of a ply extending in a radial direction of the pneumatic radial tire 1, is formed into a toroidal shape between the pair of bead cores 6.

A tread 8 is formed via a plurality of belt layers 7 on an outside in the tire radial direction of the crown portion 2 with respect to the carcass 10.

The carcass 10 includes a turn-up ply 11 and a down ply 12. The turn-up ply 11 is a plurality of plies that extend in the tire radial direction and that are coated with rubber.

The turn-up ply 11 includes a main body portion 11a and turn-up portions 11b. The main body portion 11a is extended in a toroidal shape across the pair of bead cores 6 and is disposed between the pair of bead cores 6. The turn-up portions 11b are turned up around the respective bead cores 6 from the inside toward the outside in the tire width direction.

The turn-up ply 11 is formed of at least one layer.

The down ply 12 is extended in a toroidal shape across the pair of bead cores 6 along a path outside the turn-up ply 11 to thereby cover the turn-up portions 11b of the turn-up ply 11 from the outside in the tire width direction. The down ply 12 extends up to the inside in the tire radial direction of the bead cores 6.

The down ply 12 is formed of at least one layer.

Reference is made to FIG. 2. A turn-up end portion 11be of the turn-up portion 11b of the turn-up ply 11 is located at the side wall portion 4. A down ply predetermined portion 12P of the down ply 12 covers the turn-up end portion 11be at the side wall portion 4 from the outside in the tire width direction.

The carcass 10 has what is called an up-down structure including the turn-up ply 11 and the down ply 12 as described above.

The pneumatic radial tire 1 is a pneumatic radial tire for airplane. The pneumatic radial tire 1 incorporates an organic fiber having a high breaking strength for a ply cord of the carcass 10 to thereby achieve pressure resistance and durability, while promoting reduction in weight of the tire by reducing the number of laminated carcass plies.

As depicted in FIG. 2, in the carcass 10, a curvature 12w is formed at the down ply predetermined portion 12P of the down ply 12, which covers the turn-up end portion 11be of the turn-up ply 11 from the outside in the tire width direction. The curvature 12w represents a part of the down ply 12 bulging in a semi-elliptical shape to the outside in the tire width direction.

Reduction in the number of laminated carcass plies through the use of the carcass plies offering high pressure resistance and durability results in increasing tension to be borne by each carcass ply to account for the reduced number of laminated carcass plies.

A maximum tensile load is applied to the carcass ply in the side wall portion 4, which flexes heavily due to a particularly large load during tire running.

The turn-up end portion 11be of the turn-up portion 11b, which is turned up around the bead core 6 in the turn-up ply 11, is located at the side wall portion 4, to which the maximum tensile load is applied. Thus, when a large load is applied, the turn-up end portion 11be of the turn-up ply 11 is pulled by a large tensile force toward the side of the bead core 6 (toward the inside in the tire radial direction) (the direction of the tensile force is indicated by the arrow of the solid line in FIG. 2).

Meanwhile, the down ply 12, which covers the turn-up end portion 11be of the turn-up ply 11 from the outside in the tire width direction, and the main body portion 11a of the turn-up ply 11, which covers the turn-up end portion 11be of the turn-up ply 11 from the inside in the tire width direction, are pulled to the inside and outside in the tire radial direction with the turn-up end portion 11be substantially as a boundary and are placed in a tensioned equilibrium state (directions of the tensile forces are indicated by the arrows of the broken lines in FIG. 2). A portion around the down ply predetermined portion 12P, at which the turn-up end portion 11be is located, thus exhibits the greatest tensile force.

Ply stiffness drastically changes before and after the turn-up end portion 11be of the turn-up ply 11, which is sandwiched between the down ply 12 and the main body portion 11a of the turn-up ply 11 in the tensioned equilibrium state. Particularly during pressure resistance testing, a peak in tensile force occurs particularly in the down ply 12 in the tensioned equilibrium state outside (outside in the tire width direction) the turn-up end portion 11be via rubber therearound, specifically, rubber Go between the turn-up end portion 11be and the down ply 12 and rubber Gi between the turn-up end portion 11be and the main body portion 11a of the turn-up ply 11. In such a case, the curvature 12w at the down ply predetermined portion 12P, which represents a part of the down ply 12 bulging in a semi-elliptical shape in cross section to the outside, allows the peak in tensile force in the down ply 12 to be eased, so that sufficient durability can be achieved with initial pressure resistance being maintained.

The curvature 12w is formed so as to bulge a part of the down ply predetermined portion 12P of the turn-up ply 11 outwardly in a semi-elliptical shape. This enables a simple curvature structure.

The curvature 12w of the down ply predetermined portion 12P of the down ply 12 is designed such that an elongation in the down ply when the curvature 12w is fully stretched is 0.5% to 3.5% of an original dimension of the down ply.

This elongation is necessary and sufficient for maintaining pressure resistance and achieving durability of the down ply 12, while easing the peak in tensile force in the down ply 12 on the outside of the turn-up end portion 11be of the turn-up ply 11 during pressure resistance testing.

A modification of the curvature of the down ply predetermined portion will be described below with reference to FIG. 3.

A pneumatic radial tire in the modification has a structure substantially identical to the structure of the pneumatic radial tire 1. Thus, same reference numerals will be used to denote all members except a curvature 12w' in the down ply predetermined portion 12P.

The curvature 12w', which is formed at the down ply predetermined portion 12P of the down ply 12, which covers the turn-up end portion 11be of the turn-up ply 11 from the outside in the tire width direction, is formed into a wave shape. Specifically, the curvature 12w' includes at least one outward bulged portion and at least one inward bulged portion.

The pneumatic radial tire 1 in the modification has the wavy curvature 12w' at the down ply predetermined portion 12P. Thus, during pressure resistance testing, the peak in tensile force in the down ply 12 on the outside of the turn-up end portion 11be of the turn-up ply 11 is sufficiently eased, so that sufficient durability can be achieved with the pressure resistance of the down ply 12 being maintained.

The wavy curvature 12w' formed at the down ply predetermined portion 12P allows an amplitude of the wave shape to be reduced and the elongation of the down ply 12 caused by the curvature 12w' to be amply obtained.

The elongation of the down ply 12 caused by the curvature 12w' is, however, set to 0.5% to 3.5% of the original dimension of the down ply 12. This elongation is necessary and sufficient for maintaining pressure resistance of the down ply 12 and achieving durability, while sufficiently easing the peak in tensile force in the down ply 12 on the outside of the turn-up end portion 11be of the turn-up ply 11 during pressure resistance testing.

The curvature may be formed into a wave shape including at least two each outward bulged portions and inward bulged portions.

A pneumatic radial tire 31 according to another embodiment will be described below with reference to FIG. 4.

The pneumatic radial tire 31 has a structure basically identical to the structure of the pneumatic radial tire 1 described above.

Specifically, a carcass 40 includes a turn-up ply 41 and a down ply 42.

The turn-up ply 41 includes a main body portion 41a and turn-up portions 41b. The main body portion 41a is extended in a toroidal shape across bead cores 36 of a pair of bead portions 35 and is disposed between the pair of bead cores 36. The turn-up portions 41b are turned up around the respective bead cores 36 from the inside toward the outside in the tire width direction.

The down ply 42 is extended in a toroidal shape across the pair of bead cores 36 along a path outside the turn-up ply 41 to thereby cover the turn-up portions 41b of the turn-up ply 41 from the outside in the tire width direction. The down ply 42 extends up to the inside in the tire radial direction of the bead cores 36.

A turn-up end portion 41be of the turn-up portion 41b of the turn-up ply 41 is located at a side wall portion 34. A down ply predetermined portion 42P of the down ply 42 covers the turn-up end portion 41be at the side wall portion 34 from the outside in the tire width direction. A turn-up ply predetermined portion 41P of the main body portion 41a of the turn-up ply 41 covers the turn-up end portion 41be from the inside in the tire width direction.

A curvature 42w is formed at the down ply predetermined portion 42P of the down ply 42, which covers the turn-up end portion 41be of the turn-up ply 41 from the outside in the tire width direction. The curvature 42w represents a part of the down ply 42 bulging in a semi-elliptical shape in cross section to the outside in the tire width direction.

Additionally, a curvature 41w is formed at the turn-up ply predetermined portion 41P of the main body portion 41a of the turn-up ply 41, which covers the turn-up end portion 41be of the turn-up ply 41 from the inside in the tire width direction. The curvature 41w represents a part of the turn-up ply 41 bulging in a semi-elliptical shape in cross section to the inside in the tire width direction.

The turn-up end portion 41be of the turn-up portion 41b, which is turned up around the bead core 6 in the turn-up ply 41, is located at the side wall portion 34, to which the maximum tensile load is applied. Thus, when a large load is applied, the turn-up end portion 41be of the turn-up ply 41 is pulled by a large tensile force toward the side of the bead core 36 (toward the inside in the tire radial direction) (the direction of the tensile force is indicated by the arrow of the solid line in FIG. 4).

Figure 4:
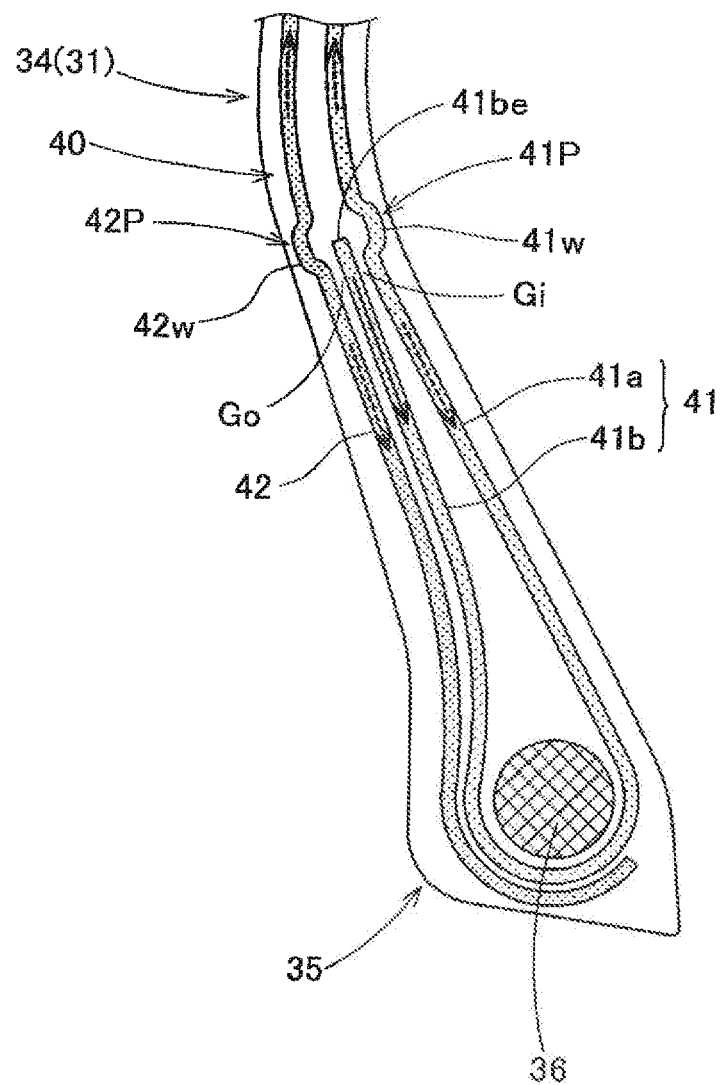
FIG. 4 is an enlarged cross-sectional view of major components of a pneumatic radial tire according to another embodiment of the present invention.

Meanwhile, the down ply 42, which covers the turn-up end portion 41be of the turn-up ply 41 from the outside in the tire width direction, and the main body portion 41a of the turn-up ply 41, which covers the turn-up end portion 41be of the turn-up ply 41 from the inside in the tire width direction, are pulled to the inside and outside in the tire radial direction with the turn-up end portion 41be substantially as a boundary and are placed in a tensioned equilibrium state (directions of the tensile forces are indicated by the arrows of the broken lines in FIG. 4). Portions around the down ply predetermined portion 42P and the turn-up ply predetermined portion 41P, at which the turn-up end portion 41be is located, thus exhibit the greatest tensile force.

Ply stiffness drastically changes before and after the turn-up end portion 41be of the turn-up ply 41, which is sandwiched between the down ply 42 and the main body portion 41a of the turn-up ply 41 in the tensioned equilibrium state. Particularly during pressure resistance testing, a peak in tensile force occurs particularly in the down ply 42 and the main body portion of the turn-up ply 41 in the tensioned equilibrium state outside and inside (outside and inside in the tire width direction) the turn-up end portion 11be via rubber therearound, specifically, rubber Go between the turn-up end portion 11be and the down ply 12 and rubber Gi between the turn-up end portion 11be and the main body portion 11a of the turn-up ply 11. In such a case, the curvature 42w at the down ply predetermined portion 42P, which represents a part of the down ply 42 bulging in a semi-elliptical shape in cross section, and the curvature 41w at the turn-up ply predetermined portion 41P, which represents a part of the main body portion 41a of the turn-up ply 41 bulging in a semi-elliptical shape in cross section, allow the peak in tensile force in the down ply 12 and the main body portion 41a of the turn-up ply 41 to be eased, so that sufficient durability can be achieved with initial pressure resistance being maintained.

An elongation in the down ply 42 when the curvature 42w is fully stretched and an elongation in the turn-up ply 41 when the curvature 41w is fully stretched are set to 0.5% to 3.5% of respective original dimensions of the down ply and the turn-up ply. These elongations are necessary and sufficient for maintaining pressure resistance and achieving durability of the down ply 12 and the main body portion 41a of the turn-up ply 41, while easing the peak in tensile force in the down ply 12 on the outside, and the main body portion 41a of the turn-up ply 41 on the inside, of the turn-up end portion 11be of the turn-up ply 12 during pressure resistance testing.

It is noted that the curvature formed at the down ply predetermined portion 42P in the down ply 42 and the curvature formed at the turn-up ply predetermined portion 41P in the main body portion 41a of the turn-up ply 41 may be formed into a wave shape as in the modification depicted in FIG. 3.

The wavy curvatures allow an amplitude of the wave shape to be reduced and the elongation caused by the curvatures to be amply obtained.

While the pneumatic radial tire has been described with reference to various embodiments, it will be understood that the embodiments are not intended to limit the present invention and various changes in form and detail may be made therein without departing from the spirit and scope of the invention.

For example, the curvature may be provided only at the turn-up ply predetermined portion of the main body portion of the turn-up ply, and not at the down ply predetermined portion of the down ply.

REFERENCE SIGNS LIST

1 . . . Pneumatic radial tire, 2 . . . Crown portion, 3 . . . Shoulder portion, 4 . . . Side wall portion, 5 . . . Bead portion, 6 . . . Bead core, 7 . . . Belt layer, 8 . . . Tread, 10 . . . Carcass,
11 . . . Turn-up ply, 11a . . . Main body portion, 11b . . . Turn-up portion, 11be . . . Turn-up end portion,
12 . . . Down ply, 12P . . . Down ply predetermined portion, 12w . . . Curvature, 12w' . . . Curvature,
31 . . . Pneumatic radial tire, 34 . . . Side wall portion, 35 . . . Bead portion, 36 . . . Bead core,
40 . . . Carcass,
41 . . . Turn-up ply, 41a . . . Main body portion, 41P . . . Turn-up ply predetermined portion, 41w . . . Curvature, 41b . . . Turn-up portion, 41be . . . Turn-up end portion,
42 . . . Down ply, 42P . . . Down ply predetermined portion, 42w . . . Curvature.

The invention claimed is:

1. A pneumatic radial tire including a carcass that includes a rubber-coated layer of a carcass ply extending in a radial direction of the tire, the carcass being formed into a toroidal shape between a pair of bead cores, the carcass ply of the carcass comprising:
   a turn-up ply including
      a main body portion extended across and disposed between the pair of bead cores, and
      turn-up portions turned up around the respective bead cores from an inside toward an outside in a tire width direction; and
   a down ply extending up to at least an inside in a tire radial direction of the bead cores so as to cover the turn-up ply including the turn-up portions from an outside, wherein
   a curvature locally bulging in a semi-elliptical shape in cross section to the outside in the tire width direction is formed at a portion of the down ply that covers a turn-up end portion of the turn-up portion of the turn-up ply from the outside in the tire width direction, and
   the curvature is determined such that an elongation in the carcass ply when the curvature is fully stretched is 0.5% to 3.5% of a length of the carcass ply having the curvature.

2. The pneumatic radial tire according to claim 1, wherein the curvature is of a wave shape bulging to the outside and the inside in the tire width direction, the curvature being formed at a portion of the down ply that covers the turn-up end portion of the turn-up portion of the turn-up ply from the outside in the tire width direction.

3. A pneumatic radial tire including a carcass that includes a rubber-coated layer of a carcass ply extending in a radial direction of the tire, the carcass being formed into a toroidal shape between a pair of bead cores, the carcass ply of the carcass comprising:
- a turn-up ply including
  - a main body portion extended across and disposed between the pair of bead cores, and
  - turn-up portions turned up around the respective bead cores from an inside toward an outside in a tire width direction; and
- a down ply extending up to at least an inside in a tire radial direction of the bead cores so as to cover the turn-up ply including the turn-up portions from an outside, wherein
- a curvature locally bulging in a semi-elliptical shape in cross section to the inside in the tire width direction is formed at a portion of the main body portion of the turn-up ply that covers the turn-up end portion of the turn-up ply from the inside in the tire width direction, and
- the curvature is determined such that an elongation in the carcass ply when the curvature is fully stretched is 0.5% to 3.5% of a length of the carcass ply having the curvature.

4. The pneumatic radial tire according to claim 3, wherein the curvature is of a wave shape bulging to the outside and the inside in the tire width direction, the curvature being formed at a portion of the main body portion of the turn-up ply that covers the turn-up end portion of the turn-up ply from the inside in the tire width direction.

* * * * *